US009143398B2

(12) United States Patent
Liu

(10) Patent No.: US 9,143,398 B2
(45) Date of Patent: Sep. 22, 2015

(54) SYSTEM AND METHOD FOR SPARE CAPACITY ALLOCATION FOR SHARED BACKUP PATH PROTECTION FOR DUAL LINK FAILURES USING SUCCESSIVE SURVIVABLE ROUTING

(71) Applicant: FutureWei Technologies, Inc., Plano, TX (US)

(72) Inventor: Victor Yu Liu, Oakland, CA (US)

(73) Assignee: Futurewei Technologies, Inc., Plano, TX (US)

(*) Notice: Subject to any disclaimer, the term of this patent is extended or adjusted under 35 U.S.C. 154(b) by 260 days.

(21) Appl. No.: 13/728,863

(22) Filed: Dec. 27, 2012

(65) Prior Publication Data

US 2014/0185432 A1    Jul. 3, 2014

(51) Int. Cl.
H04W 4/00    (2009.01)
H04L 12/24    (2006.01)
H04L 12/701    (2013.01)
H04L 12/703    (2013.01)

(52) U.S. Cl.
CPC ........ H04L 41/0668 (2013.01); H04L 41/0896 (2013.01); H04L 45/00 (2013.01); *H04L 41/0654* (2013.01); *H04L 45/28* (2013.01)

(58) Field of Classification Search
None
See application file for complete search history.

(56) References Cited

U.S. PATENT DOCUMENTS 6,744,727 B2    6/2004 Liu et al.
2012/0250500 A1    10/2012 Liu

OTHER PUBLICATIONS

Victor Yu Liu; David Tipper ("Spare Capacity Allocation Using Shared Backup Path protection for Dual Link Failures", Design of Reliable Communication Networks (DRCN), Oct. 2011).*
Yu Liu; David Tipper; Peerapo Siripongwutikorn ("Approximate Optimal Spare Capacity Allocation by Successive Survivable Routing", IEEE/ACM, vol. 13, No. 1, Feb. 2005).*
Liu, V.Y., et al., "Space capacity allocation using shared backup path protection for dual link failures," Computer Communications, 2012, http://dx.doi.org/10.1016/j.comcom.2012.09.007, 12 pages.
Liu, Y., et al., "Approximating Optimal Spare Capacity Allocation by Successive Survivable Routing," IEEE/ACM Transactions on Networking, Feb. 2005, vol. 13, No. 1, pp. 198-211.
Liu, V.Y., et al., "Space Capacity Allocation Using Shared Backup Path Protection with Partially Disjoint Paths for Dual Fiber-Cuts Protection," Abstract, Oct. 10, 2011, 1 page.

(Continued)

Primary Examiner — Kodzovi Acolatse
(74) Attorney, Agent, or Firm — Slater & Matsil, L.L.P.

(57) ABSTRACT

A method and apparatus are provided for enabling spare capacity allocation (SCA) in a network for protecting against dual link failures using a successive survivable routing (SSR) algorithm that has better scalability and shorter computation time than other techniques. An embodiment method implemented by an apparatus includes computing the SCA for a plurality of flows in the network for a plurality of primary backup paths and a plurality of secondary backup paths corresponding to a plurality of working paths for the flows using a SSR algorithm. Another embodiment method includes computing the SCA for each of a plurality of flows in the network for a plurality of primary backup paths and a plurality of secondary backup paths corresponding to a plurality of working paths for the flows using a SSR algorithm, and aggregating the computed SCA for the primary backup paths and the secondary backup paths for all the flows.

15 Claims, 5 Drawing Sheets

(56) References Cited

OTHER PUBLICATIONS

Liu, Y., et al., "Space Capacity Allocation for Non-Linear Link Cost and Failure-Dependent Path Restoration," Department of Information Science and Telecommunications, University of Pittsburgh, 2001, 8 pages.

Liu, V.Y., et al., "Space Capacity Allocation Using Shared Backup Path Protection for Dual Link Failures," 8$^{th}$ International Workshop on the Design of Reliable Communiation Networks (DRCN), 2011, pp. 118-125.

Liu, Y., et al., "Successive Survivable Routing for Node Failures," Globelcom, 2001, 5 pages.

He, W., et al., "Path-Based Protection for Surviving Double-Link Failures in Mesh-Restorable Optical Networks," Dec. 1, 2003, 5 pages.

Herzberg, M., et al., "Compound OD Cycles for a Wide Variety of Suvivability Policies in Transport Networks," Network Protocols and Alogrithms, www.macrothink.org/npa, ISSN 1943-3581, vol. 1, No. 1, 2009, pp. 86-107.

Xu, D., et al., "Policy-based shared path protection for dual link failures," Proceedings of SPIE OptiComm 2003: Optical Networking and Communicatoins, vol. 5285, 2003, pp. 102-113.

Prinz, R.G., et al., "Dual Failure Protection in Multilayer Networks based on Overlay or Augmented Model," Oct. 16, 2005, 8 pages.

Ruan, L., et al., "A Hybrid Protection/Restoration Scheme for Two-Link Failure in WDM Mesh Networks," 2010 IEEE Globelcom Proceedings, 2010, 5 pages.

Ramasubramanian, S., et al., "Dual-Link Failure Resiliency Through Backup Link Matual Exclusion," IEEE/ACM Transactions on Networking, vol. 16, No. 1, Feb. 2008, pp. 157-169.

Tsin, Y.H., "Yet another optimal algorithm for 3-edge-connectivity," Journal of Discrete Algorithms 7, 2009, pp. 130-146.

Liu, Y., "Spare Capacity Allocation: Model, Analysis and Algorithm," University of Pittsburgh, 2001, 132 pages.

\* cited by examiner

SYSTEM AND METHOD FOR SPARE CAPACITY ALLOCATION FOR SHARED BACKUP PATH PROTECTION FOR DUAL LINK FAILURES USING SUCCESSIVE SURVIVABLE ROUTING

TECHNICAL FIELD

The present invention relates generally to a system and method for improving network communications and, in particular embodiments, to a system and method for spare capacity allocation for shared backup path protection for dual link failures.

BACKGROUND

Modern communications and data networks are comprised of nodes that transport data through the network via links that connect the nodes. The nodes may include routers, switches, bridges, or combinations thereof that transport the individual data packets or frames through the network over links between the nodes. The data frames may be forwarded on pre-established paths that include nodes and links. Different path protection schemes may be used to protect link or node failures on a path and avoid substantial data loss. Some path protection schemes handle single link failures, where a working path is assigned a backup path that is reserved in case of failures in the working path. Other more stringent schemes may be needed to handle dual link failures, where the working path is assigned a primary backup path that is reserved in case of failures in the working path, and a secondary backup path that is reserved in case of failures in the primary backup path. In some cases, at least some portions of the primary/secondary backup paths may share some network resource capacity (e.g., bandwidth) to save resources/cost in the network, which is referred to as spare capacity allocation for dual link failures. This may require a spare capacity allocation scheme for protecting against dual link failures.

SUMMARY OF THE INVENTION

In accordance with an embodiment, a method implemented by an apparatus for allocating shared spare resource capacity for a plurality of flows on a plurality of working paths in a network includes iteratively updating shortest cost link information for a plurality of primary backup paths corresponding to the working paths using initial spare capacity provisioning information for the primary backup paths, and iteratively updating spare capacity provisioning information for the primary backup paths according to the updated shortest cost link information for the primary backup paths to provide final spare capacity provisioning information for the primary backup paths. The method further includes iteratively updating shortest cost link information for a plurality of secondary backup paths corresponding to the working paths using initial spare capacity provisioning information for the secondary backup paths and the final spare capacity provisioning information for the primary backup paths, and iteratively updating spare capacity provisioning information for the secondary backup paths according to the updated shortest cost link information for the secondary backup paths to provide final spare capacity provisioning information for the secondary backup paths and the primary backup paths.

In accordance with another embodiment, a method implemented by an apparatus for allocating shared spare resource capacity for a plurality of flows on a plurality of working paths in a network includes, for each of the flows, iteratively updating shortest cost link information for a plurality of primary backup paths and a plurality of secondary backup paths corresponding to the working paths using initial spare capacity provisioning information for the primary backup paths and the secondary backup paths, updating spare capacity provisioning information for the primary backup paths and the secondary backup paths according to the updated shortest cost link information to provide final spare capacity provisioning information for the primary backup paths and the secondary backup paths, and aggregating for all the flows the final spare capacity provisioning information for the primary backup paths and the secondary backup paths.

In yet another embodiment, an apparatus for allocating shared spare resource capacity for a plurality of flows on a plurality of working paths in a network includes a processor and a computer readable storage medium storing programming for execution by the processor. The programming includes instructions to iteratively update shortest cost link information for a plurality of primary backup paths corresponding to the working paths using initial spare capacity provisioning information for the primary backup paths, and iteratively update spare capacity provisioning information for the primary backup paths according to the updated shortest cost link information for the primary backup paths to provide final spare capacity provisioning information for the primary backup paths. The programming includes further instructions to iteratively update shortest cost link information for a plurality of secondary backup paths corresponding to the working paths using initial spare capacity provisioning information for the secondary backup paths and the final spare capacity provisioning information for the primary backup paths, and iteratively update spare capacity provisioning information for the secondary backup paths according to the updated shortest cost link information for the secondary backup paths to provide final spare capacity provisioning information for the secondary backup paths and the primary backup paths.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
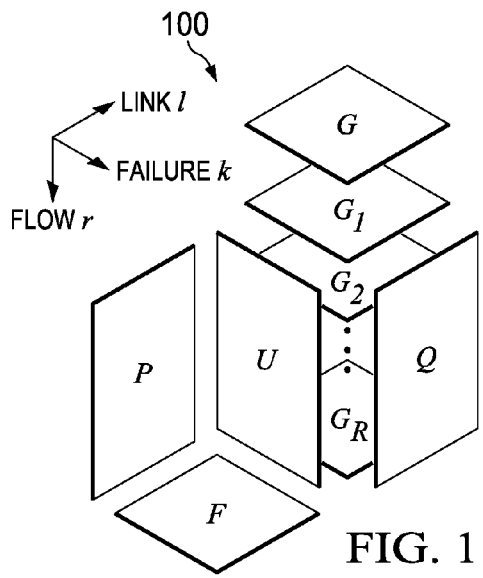
FIG. 1 is a schematic diagram of a spare capacity allocation model for single link failures.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Multiple network survivability (or protection) techniques have been proposed for different network technologies. The survivability techniques may ensure network operation survival under different conditions that may affect the network, such as link/node failures. Examples of survivability techniques include multiple homing, self-healing rings, pre-planned backup routes or paths, and p-cycles. The terms routes and paths are used herein interchangeably. Some of the survivability techniques correspond to single link failures, while other survivability techniques are needed for dual link failures.

Disclosed herein is a system and method for enabling spare capacity allocation (SCA) for protecting against dual link failures. The SCA method may provide better scalability and flexibility than other survivability techniques for dual link failures. The method uses a SCA model for dual link failures in networks that use primary and secondary backup paths to protect a working path for one or more data flows. The model may be used to determine the allocation of shared spare capacity among the paths from different flows. The networks that handle dual link failures may include mesh-like Internet Protocol (IP)/Multiprotocol Label Switching (MPLS) networks, Wavelength Division Multiplexing (WDM) networks, backbone networks, and other networks that may require high level of network reliability.

The SCA model for dual link failures may minimize a pre-planned spare resource while guaranteeing substantially full service recovery (e.g., without data loss) upon a dual link failure in the network. The SCA model for dual link failures may provide end-to-end protection for a traffic flow, which may be assigned a working path and two pre-planned backup paths. The spare capacity of one or more links (and nodes) may be shared among multiple primary/secondary backup paths for flows that have disjoint working paths. This SCA model may compute the shared spare capacity for dual link failures with reduced redundancy (i.e., using minimum shared capacity) among the backup paths.

To guarantee a solution that is practical or feasible in terms of computation time (and complexity), a successive survivable routing (SSR) algorithm that is heuristic in nature is used to solve the SCA problem for dual link failures. The SSR algorithm for dual link failures computes a plurality of primary backup paths and corresponding secondary backup paths for given working paths with optimal (e.g., minimum) or near optimal spare capacity among the backup paths. Selecting primary and secondary backup paths with near optimal spare capacity provides reduced network cost (e.g., increases shared network resources). The SSR algorithm has a reduced computation time in comparison to other algorithms for the case of dual link failure, such as algorithms that use A Mathematical Programming Language (AMPL) software with integer linear programming (ILP) solvers. The reduction in computation time using the SSR algorithm is further improved as the size of the considered network increases (e.g., in term of links, nodes, and flows). This improvement or reduction in computation time requirement translates in reduction in computation cost. In the case of substantially large networks, such as actual or real deployed networks, the SSR algorithm may be more feasible or the only scalable solution for the SCA model for dual link failures.

A SCA model for single link failures was described in U.S. Pat. No. 6,744,727, Jun. 1, 2004 by Y. Liu, et al., entitled "Apparatus and Method for Spare Capacity Allocation," which is incorporated herein by reference. The SCA model for single link failures is also described by Y. Liu, et al. in "Approximating Optimal Spare Capacity Allocation by Successive Survivable Routing," in IEEE/Association for Computing Machinery (ACM) Transactions on Networking, February 2005, which is incorporated herein by reference. This model uses a Shared Backup Path Protection (SBPP) scheme for single failures, where each flow uses a disjoint backup path to protect the flow's working path upon any single link failure. Provisioning enough spare capacity using the SBPP scheme may be difficult for achieving substantially full restoration for any single link failure. The notation used in the SCA model for single link failures is summarized in Table 1 below.

TABLE 1

Notation.

| | |
|---|---|
| N, L, R, K | Numbers of nodes, links, flows, and failures |
| n, l, r, k | Indices of nodes, links, flows, and failures |
| $P = \{p_r\} = \{p_{rl}\}$ | Working path link incidence matrix |
| $Q = \{q_r\} = \{q_{rl}\}$ | Backup path link incidence matrix |
| $M = \text{Diag}(\{m_r\})$ | Diagonal matrix of bandwidth $m_r$ of flow r |
| $G = \{g_{lk}\}_{L \times K}$ | Spare provision matrix, $g_{lk}$ is spare capacity on link l for failure k |
| $G_r = \{g_{lk}{}^r\}_{L \times K}$ | Contribution of flow r to G |
| $s = \{s_l\}_{L \times 1}$ | Spare capacity vector |
| $\phi = \{\phi_l\}_{L \times 1}$ | Spare capacity cost function |
| W, S | Total working, spare capacity |
| $\eta = S/W$ | Network redundancy |
| o(r), d(r) | Origin/destination nodes of flow r |
| $B = \{b_{nl}\}_{N \times L}$ | Node link incidence matrix |
| $D = \{d_{rn}\}_{R \times N}$ | Flow node incidence matrix |
| $F = \{f_{kl}\}_{K \times L}$ | Failure link incidence matrix, $f_{kl} = 1$ if and only if (iff) link l fails in failure scenario k |
| $U = \{u_{rk}\}_{R \times K}$ | Flow failure incidence matrix, $u_{rk} = 1$ iff failure scenario k affects flow r's working path |
| $T = \{t_{rl}\}_{R \times L}$ | Flow tabu-link matrix, $t_{rl} = 1$ iff link l should not be used on flow r's backup path |

In the SCA model for single link failures, a network may be modeled by a directed graph of N nodes, L links, and R flows. Flow r ($1 \leq r \leq R$) may have its origin/destination node pair (o(r),d(r)) and traffic demand $m_r$. Working and backup paths of flow may be represented by two 1×L binary row vectors $p_r=\{p_{rl}\}$ and $q_r=\{q_{rl}\}$ respectively. The i-th element in one of the vectors may be equal to one if and only if (iff) the corresponding path uses link l. The path link incidence matrices for working and backup paths may be the collections of these vectors, forming two R×L matrices $P=\{p_{rl}\}$ and $Q=\{q_{rl}\}$ respectively. The relation $M=\text{Diag}(\{m_r\}_{R \times 1})$ may denote the diagonal matrix representing demand bandwidth. The topology may be represented by the node-link incidence matrix $B=(b_{nl})_{N \times L}$, where $b_{nl}=1$ or $-1$ iff node n is the origin or the destination node of link l. The relation $D=(d_{rn})_{R \times N}$ may be the flow node incidence matrix where $d_{rn}=1$ or $-1$ iff o(r)=n or d(r)=n.

K failure scenarios may be characterized in a binary matrix $F=\{f_k\}_{K \times 1}=\{f_{kl}\}_{K \times L}$. The row vector $f_k$ in may be for failure scenario k and its element $f_{kl}$ may be equal to one iff link l fails in scenario k. In this way, each failure scenario may include a set of one or more links that may fail simultaneously in the scenario. For a failed node, all the node's adjacent links may be marked as failed. A flow failure incidence matrix may be denoted as $U=\{u_r\}_{R \times 1}=\{u_{rk}\}_{R \times K}$, where $u_{rk}=1$ iff flow r is affected by failure k, and $u_{rk}=0$ otherwise. The flow tabu-link matrix $T=\{t_r\}_{R \times 1}=\{t_{rl}\}_{R \times L}$ may have $t_{rl}=1$ iff the backup path of flow r should not use link l, and $t_{rl}=0$ otherwise. U and T may be found given P and F, respectively, as shown in equations (7) and (8) below. A Boolean matrix multiplication operation "⊙" may be used in equations (7) and (8), which is a matrix multiply operator that is similar to normal matrix multiplication except that the general numerical addition 1+1=2 is replaced by the Boolean "or" 1⊕1=1. Using this Boolean operator, the logical relations among links, paths, and failure scenarios may be simplified into two matrix operations.

The matrix $G=\{g_{lk}\}_{L \times K}$ may denote a spare provision matrix whose elements $g_{lk}$ are the minimum spare capacity required on link l when failure k occurs. The relation K=L may be true when the SCA protects all single link failures. With the backup paths Q, the demand bandwidth matrix M, the working path P, and the failure matrix F, G may be determined by equations (3) and (7) below. The minimum spare capacity required on each link may be denoted by the column vector $s=\{s_l\}_{L \times 1}$, which may be found in equation (2) below. The function max in equation (2) may indicate that an element in s is equal to the maximum element in the corresponding row of G. This may be equivalent to s≥G in this model. The parameter $\phi_l$ may denote the cost function of spare capacity on link l. The vector $\phi=\{\phi_l\}_{L \times 1}$ may be a column vector of these cost functions and φ(s) may give the cost vector of the spare capacities on all links. The total cost of spare capacity in the network may correspond to $e^T \phi(s)$, where e is the unit column vector of size L. For simplicity, all cost functions φ(s) may be identity functions, i.e., φ(s)=s. The term $e^T$ corresponds to the transpose of the unit vector e according to the known standard transpose matrix operation. The standard transpose operation is also used in other equations below.

Using the notation and definitions above, the SCA model for single link failures may be formulated as follows:

$$\min_{Q,s} S = e^T s \quad (1)$$

$$s.t.: s = \max G \quad (2)$$

$$G = Q^T M U \quad (3)$$

$$T + Q \leq 1 \quad (4)$$

$$Q B^T = D \quad (5)$$

$$Q: \text{binary} \quad (6)$$

$$U = P \odot F^T \quad (7)$$

$$T = U \odot F \quad (8)$$

This SCA model has the objective to minimize the total spare capacity in equation (1) with the constraints in equations (2) to (8). The decision variables are the backup path matrix Q and the spare capacity vector s. The constraints in equations (2) and (3) may associate these variables, i.e., the spare capacity allocation s may be derived from the backup paths in Q. The constraint of equation (4) may guarantee that every backup path does not use any link which may fail simultaneously with any link on its working path. A flow conservation constraint in equation (5) may guarantee that backup paths given in Q are feasible paths of flows in a directed network. The incidence matrices U and T may be pre-computed. The matrix U may indicate the failure cases that influence the working paths. The matrix T may indicate the links that are to be avoided in the backup paths. The link load, the traffic flows, and their routes may be symmetric. In a directed network, each link may have two directions with asymmetric load. In this case, the dimensions of the matrices above may be doubled, e.g., 2L instead of L.

In another approach, the spare provision matrix G may be obtained by aggregation of per-flow based information, which may improve scalability of the solution. FIG. 1 shows a graphical representation of a SCA model 100 for single link failures that may use aggregation of per-flow information. In the SCA model 100, each flow r may have a contribution to G as $G^T = \{g_{lk}^r\}_{L \times K}$. This is shown in equation (9) below, where $u_r$ and $q_r$ are the r-th row vectors in U and Q, respectively. Thus, the spare provision matrix G may be calculated as shown in equation (10) below. This is also shown in the stack of $G^r$ in FIG. 1.

$$G^r m_r (q_r^T u_r) \forall r, 1 \leq r \leq R \quad (9)$$

$$G = \Sigma_{r=1}^R G^r \quad (10)$$

Using the above matrices and per-flow based information in P, Q may be replaced by G as the stored network state information for spare capacity sharing. As such, the space complexity may be reduced from O(RL) to O(LK) and may be independent of the number of flows, R. This may improve the scalability of the spare capacity sharing information and make the model suitable for distributed implementation.

The SCA model above is a mixed integer linear programming (ILP) problem that is nondeterministic polynomial time (NP)-complete. Solving the problem for large networks may be infeasible using enumerative methods. As described above, Y. Liu, et al. proposed a successive survivable routing (SSR) heuristic solution model. The SSR algorithm finds solutions by routing backup paths iteratively. Each backup path computation uses a shortest path algorithm. The link routing metric is an incremental spare capacity $v_r = \{v_{rl}\}$ that is computed from the most recent spare provision matrix, which is further based on previously routed backup paths. After all flows find their backup paths, the SSR solution continues to update existing backup paths whenever a new one could use less spare capacity. This process keeps reducing total spare capacity until it converges, (e.g., there are no more backup path updates). Different random ordering of the flows for routing backup paths are used to provide diversity and avoid local minima. The best solution is used as the final one, which in numerical results is expected to be near optimal.

Figure 2:
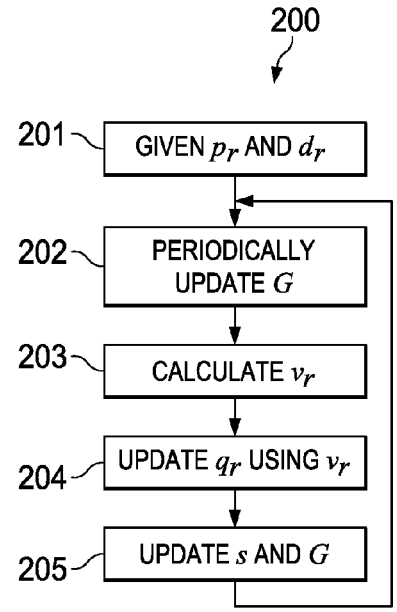
FIG. 2 illustrates a successive survivable routing (SSR) method for spare capacity allocation for single link failures.

FIG. 2 illustrates a SSR method 200 for solving the SCA model for single link failures that includes steps for flow r. At step 201, a failure impact vector $u_r$ and a tabu link vector $t_r$ are calculated using the failure matrix F, the working path row vector $p_r$, and the destination node $d_r$, where $u_r$ and $t_r$ are the r-th row vectors in the matrices U and T in equations (7) and (8), respectively. At step 202, the spare provision matrix G is recomputed using equation (3). At step 203, the link metric $v_r$ is calculated from G and traffic flow r's contribution $G^r = m_r (q_r^T u_r)$, $1 \leq r \leq R$ as follows. Given G, $q_r$ and $G^r$ for current flow r, let $G^{-r} = G - G^r$ and $s^{-r} = \max G^{-r}$ be the spare provision matrix and the link spare capacity vector, respectively, after current backup path $q_r$ is removed. Further, let $q_r^+$ denote an alternative backup path for flow r, and function $G^{r+}(q_r^+) = m_r q_r^{+T} u_r$. This new path $q_r^+$ produces a new spare capacity reservation vector in a function format of $s^+(q_r^+) = \max(G^{-r} + G^{r+}(q_r^+))$. Further, let $q_r^+ = e - t_r$, which assumes the backup path uses non-tabu links. Hence, $v_r$ can be calculated as $$\{v_{rl}\}_{L \times 1} = \phi(s^+(e - t_r)) - \phi(s^{-r}), \quad (11)$$

where $t_r$ is the binary flow tabu-link vector of flow r. The element $v_{rl}$ is the cost of the incremental spare capacity on link l if this link is used on the backup path.

At step 204, the shortest path algorithm is used with the link metric $v_r$ to find a new or updated backup path $q_r^{new}$. This path excludes the tabu links indicated in $t_r$. At step 205, the original backup path $q_r$ is replaced with the new backup path $q_r^{new}$ if the new path has the lower cost based on the link metrics $v_r$, e.g., if $v_r^T q_r > v_r^T q_r^{new}$. After step 205, the SSR method 200 returns to step 202 to update the backup path for another flow. This iterative process finds backup routes and allows minimizing the required total spare capacity shared among the backup routes. After backup paths are found for all flows, the iteration continues until a termination condition is met. For instance, the termination condition may be that there is no backup update for all flows in the recent iteration or that a predetermined maximum number of updates is reached.

The SSR method 200 can be repeated for different ordered sets of the flows. For each set, a different order of flows is generated randomly and the set is then processed using one implementation of the method 200. The same is repeated for as many random sets as deemed necessary or sufficient. For example, 50 or 100 different random order sets of flows may be solved using 50 or 100 implementations of the method 200. A larger number of sets and implementations may be needed for larger number of flows or larger networks. The best solution is then selected from all the solutions obtained by repeating the method 200 for each considered set. The process of implementing the method 200 for different ordered sets of flows and then selecting the best solution is expected to provide a near optimal solution for the SCA model for single link failures, for example to avoid local minima results.

In the case of protecting dual link failures, each flow may have a working path and two backup paths. These three paths for the flow are disjoint, e.g., are established along different corresponding nodes/links. However, some of the backup paths for different flows may share capacity in the network, to reduce cost and/or preserve resources. The shared capacity may correspond to shared bandwidth, nodes, links, other resources, or combinations thereof.

Figure 3:
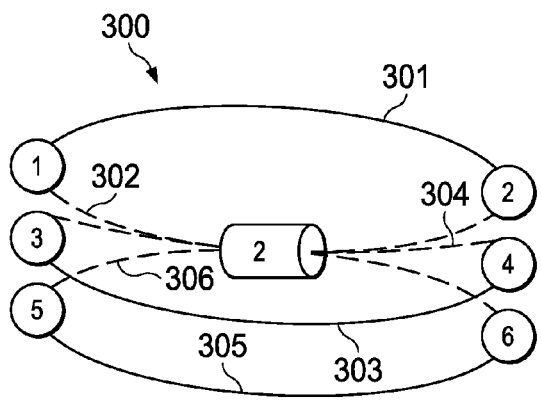
FIG. 3 is a schematic diagram of a dual link protection scenario.

FIG. 3 illustrates an embodiment of a dual link protection scenario 300, where each flow may be assigned a working path, a primary backup path, and a secondary backup path. The dual link protection scenario 300 comprises three working paths 301, 303, and 305 for three corresponding data flows. The working paths 301, 303, and 305 have corresponding primary backup paths 302, 304, and 306 and three corresponding secondary backup paths (not shown). Further, for each flow, the working paths 301, 303, and 305 may be disjoint from their corresponding primary backup paths 302, 304, and 306 (and from the corresponding secondary paths). Specifically, the working path 301 and the corresponding primary backup path 302 for a first flow between the nodes 1 and 2 have separate links, and hence separate allocated capacity. Similarly, the working path 303 and the corresponding primary backup path 304 for a second flow between the nodes 3 and 4 have separate links. The working path 305 and the corresponding primary backup path 306 for a third flow between the nodes 5 and 6 also have separate links. However, the primary backup paths 302, 304, and 306 for the different flows may share some of the links, and hence may have shared allocated capacity. For instance, the three primary backup paths 302, 304, and 306 for the three flows may share 2 units of bandwidth, which may correspond to the shared spare capacity allocated to the three flows.

Figure 4:
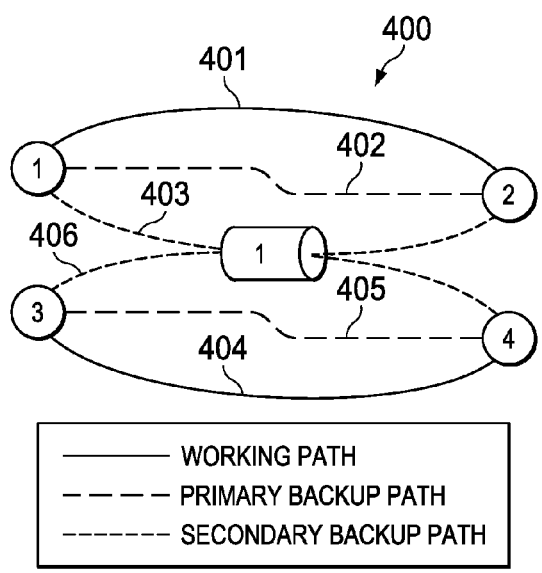
FIG. 4 is a schematic diagram of another dual link protection scenario.

FIG. 4 illustrates an embodiment of another dual link protection scenario 400, where each flow may be assigned a working path, a primary backup path, and a secondary backup path. The dual link protection scenario 400 comprises two working paths 401 and 404 for two corresponding flows. The working paths 401 and 404 have corresponding primary backup paths 402 and 405 and two corresponding secondary backup paths 403 and 406. Further, for each flow, the working paths 401 and 404 are disjoint from their corresponding primary backup paths 402 and 405 and their corresponding secondary paths 403 and 406. Specifically, the working path 401 and the corresponding primary backup path 402 and secondary backup path 403 for a first flow between the nodes 1 and 2 have separate links, and hence separate allocated capacity. Similarly, the working path 404 and the corresponding primary backup path 405 and secondary backup path 406 for a second flow between the nodes 3 and 4 have separate links. However, the secondary backup paths 403 and 406 for the different flows may share some of the links, and hence may have shared allocated capacity. For instance, the two secondary backup paths 403 and 406 for the two flows may share 1 unit of bandwidth, which may correspond to the shared spare capacity allocated to the two flows.

To determine or allocate the shared spare capacity for the backup paths in the scenarios 300 and 400 with minimum allocated total spare capacity, a SCA model for dual link failures may be used. The SCA model for dual link failures may be formulated for each flow r to obtain a corresponding spare provision matrix $G^r$, which may be used as the building block for spare capacity sharing for a plurality of flows. Hence, a spare provision matrix G may be obtained by combining or aggregating the obtained spare provision matrices for a plurality of flows, e.g., in a manner similar to the aggregation in the SCA model 100. For instance, the element $g_{lk}^r$ may indicate the spare capacity required for flow r on link l when dual link failure case k happens. The total number of dual link failures may be $K = \binom{L}{2} = L(L-1)/2$, i.e., the number of possible combinations of two links in a set of L links. Each failure $k \in 1 \ldots K$ may correspond to a pair of failed links l, j. The index k may be determined as $k=(i-1) \times L+(j-i)$ where $1 \leq i < j \leq L$. The failures of two links may happen at about the same time or shortly close to one another so that traffic rerouting happens only once. In a dual link failure scenario k, the working and backup paths of flow r may be impacted, and hence the spare capacity on the backup paths may need bandwidth reservation.

In one case, when a dual link failure k breaks the working path, but not the primary backup path, traffic may be protected by the primary backup path. The links on the primary backup path may require a bandwidth demand $m_r$. In the SCA model formulation, $p_{ri}=1$ iff link i is on the working path $p_r$ and $q_{rj}=1$ iff a link j is on the primary backup path $q_r$. Hence, $p_{ri}(1-q_{rj})=1$ may indicate that link i is on the working path while link j is not on the primary backup path. The parameter $u_{rk}^{[1]}$ may be set as $u_{rk}^{[1]} = p_{ri}(1-q_{rj}) \oplus (1-q_{ri})p_{rj}$, where $\oplus$ is the binary plus which gives $1 \oplus 1=1$. Hence, $u_{rk}^{[1]}=1$ may indicate that failure k contains one link on the working path $p_r$ but does not contain any link on the primary backup path $q_r$. For this failure case k, the spare capacity on another link l on the primary backup path may reserve bandwidth $m_r$. This may be formulated as $g_{lk}^{r[1]} = m_r q_{rl} u_{rk}^{[1]}$. These equations may also be rewritten in a vector or matrix format as in equations (12) and (13).

$$G^{r[1]} = \{g_{lk}^{r[1]}\} = m_r q_r^T u_r^{[1]} \qquad (12)$$

$$u_r^{[1]} = \text{vec}(p_r^T \bar{q}_r \oplus \bar{q}_r^T p_r) \qquad (13)$$

In the above equations, $\text{vec}(\cdot)$ converts a matrix with index (i,j) into a row vector with index k and $\bar{q}_r = e - q_r$ where e is a unit row vector with size L. The length of the row vector $u_r^{[1]}$ may be $L^2$ instead of the number of failures $\binom{L}{2}$. This may help to maintain easier matrix formulation and conversion between k and i, j. The actual failure size may be easily controlled by removing duplicated cases during the implementation. For this reason, the SCA model formulation may use $k=(i-1)L+j$ and $K=L^2$.

In another case, when the failure case k contains one link on the working path $p_r$ and another link on the primary backup path $q_r$, traffic may be rerouted to the secondary backup path $z_r$. Thus, the links on the secondary backup path may need spare capacity to meet bandwidth demand $m_r$ for failure case k. In this case, $u_{rk}^{[2]}$ may be set as $u_{rk}^{[2]} = p_{rl}q_{rj} \oplus q_{rl}p_{rj}$. Hence, $u_{rk}^{[2]} = 1$ may indicate that failure case k breaks the working path and the primary backup path $q_r$ at the same time. Hence, the spare capacity on link on the secondary backup path may be $m_r$. This may be formulated as $g_{lk}^{r[2]} = m_r z_r^T u_r^{[2]}$. These equations may be rewritten in matrix format as in equations (14) and (15).

$$G^{r[2]} = \{g_{lk}^{r[2]}\} = m_r z_r^T u_r^{[2]} \quad (14)$$

$$u_r^{[2]} = \text{vec}(p_r^T q_r \oplus q_r^T p_r) \quad (15)$$

In the two cases above, the final per-flow based spare provision matrix is given in equation (16).

$$G^r = G^{r[1]} + G^{r[2]}. \quad (16)$$

The failure matrices F and T in equations (7) and (8) above in the single failure SCA model 100 may not be used in the SCA model for dual link failures. Instead, F may become an identical matrix for the link failure, and T may be simplified to P, as described in detail below.

Using the aggregation of the per-flow based spare provision matrix above and the additional notation in Table 2 below, the SCA model for dual link failures may be formulated as in equations (17) to (23) below.

TABLE 2

Additional notation for dual link failure.

| | |
|---|---|
| i, j | Indices of links in a dual failure k |
| $Q = \{q_r\} = \{q_{rl}\}$ | Primary backup path link incidence matrix |
| $Z = \{z_r\} = \{z_{rl}\}$ | Secondary backup path link incidence matrix |
| $G^{r[y]} = \{g_{lk}^{r[y]}\}_{L \times K}$ | Contribution of flow r's y-th backup path to G, y = 1 or 2 for primary or secondary |
| $U^{[y]} = \{u_{rk}^{[y]}\}_{R \times K}$ | The incidence matrix for flow r's y-th backup path and failures, $u_{rk}^y = 1$ iff failure scenario k causes flow r's traffic to use its y-th backup path, y = 1 or 2 |
| $S_1, S_2$ | Total spare capacity reserved for the primary or secondary backup paths |
| $\eta_1, \eta_2$ | Redundancy value for the primary or secondary backup paths, $\eta_y = S_y/W$ |
| $\delta_s, \gamma_s$ | Value and percentage of redundancy reduction from a Passive to an Active approach in scheme s, s is 1 + 1:1 or 1:1:1 (described below) |

$$\min_{q,z,s} S = e^T s \quad (17)$$

$$s.t.: s = \max G \quad (18)$$

$$G = Q^T M U^{[1]} + Z^T M U^{[2]} \quad (19)$$

$$P + Q + Z \leq 1 \quad (20)$$

$$QB^T = D \quad (21)$$

$$ZB^T = D \quad (22)$$

$$Q, Z: \text{binary} \quad (23)$$

The objective of equation (17) may be similar to equation (1), which is to minimize the total spare capacity. In equation (17), the decision variables include not only the spare capacity s and the primary backup path matrix Q, but also the secondary backup path matrix Z. In the constraint in equation (18), the spare capacity column vectors may be derived from the maximum values of elements in rows, across all failures, in the spare provision matrix G. This may indicate that the required spare capacity on a link is equivalent to the highest "watermark" from all possible dual link failures. In the constraint in equation (19), the spare provision matrix may be derived from backup paths. This may be a matrix format, equivalent to the aggregation of per-flow based information from equations (10), (16), (12), and (14). The constraint in equation (20) may require the working and backup paths to be mutually disjoint, i.e., these paths may use the same link at most once. The constraints in equations (21) and (22) are the flow balance requirements, which may guarantee that these paths in Q and Z are valid routes between the source and destination nodes. The constraint in equation (23) may require backup path decision variables to be binary to ensure that each backup path is not bifurcated. The row vectors $u^{[y]}$ in $U^{[y]}$, $y \in \{1, 2\}$ may be derived in equations (13) and (15) to indicate which failure case k may cause traffic detour to its primary or secondary backup path.

The SCA model above for dual link failures may be a non-linear integer programming problem. Both terms in the right side of equation (19) may involve two design variables to multiply together. In the first term $Q^T M U^{[1]}$, the design variable Q is multiplied by another variable $U^{[1]}$, which may be computed from $q_r$ in equation (13). Similarly, the second term $Z^T M U^{[2]}$ may be based on the multiplication of decision variables Z and Q via $u^{[2]}$ in equation (15). To remove the non-linearity in the first term, equation (13) may be replaced with a slightly different equation (24), where the original $\bar{q}_r$ is replaced by e, as follows:

$$u_r^{[1]} = \text{vec}(p_r^T e \oplus e^T p_r). \quad (24)$$

An embodiment SSR algorithm similar to the SSR method 200 can be used to solve the two ILP models above, $Q^T M U^{[1]}$ and $Z^T M U^{[2]}$, sequentially in that order. Specifically, the "flow failure incidence matrix" U that is used in the single failure SSR algorithm (the method 200) is replaced by $U^{[1]}$ and $U^{[2]}$, as computed in equations (13) and (15) respectively. Further, when a primary backup path is not available, the unit vector e in equation (24) is used instead of $\bar{q}_r$ in equation (13). The "flow tabu-link matrix" T in single failure SSR is replaced by two matrices $T^{[1]}$ and $T^{[2]}$. The elements of $T^{[1]}$ and $T^{[2]}$ indicate tabu links that may not be used by the primary or secondary backup paths respectively. For the secondary backup paths, the path vector z replaces q in the steps for single failure SSR algorithm (the method 200), where the symbol q is only used by the primary backup paths in the dual link failure SCA models.

Figure 5:
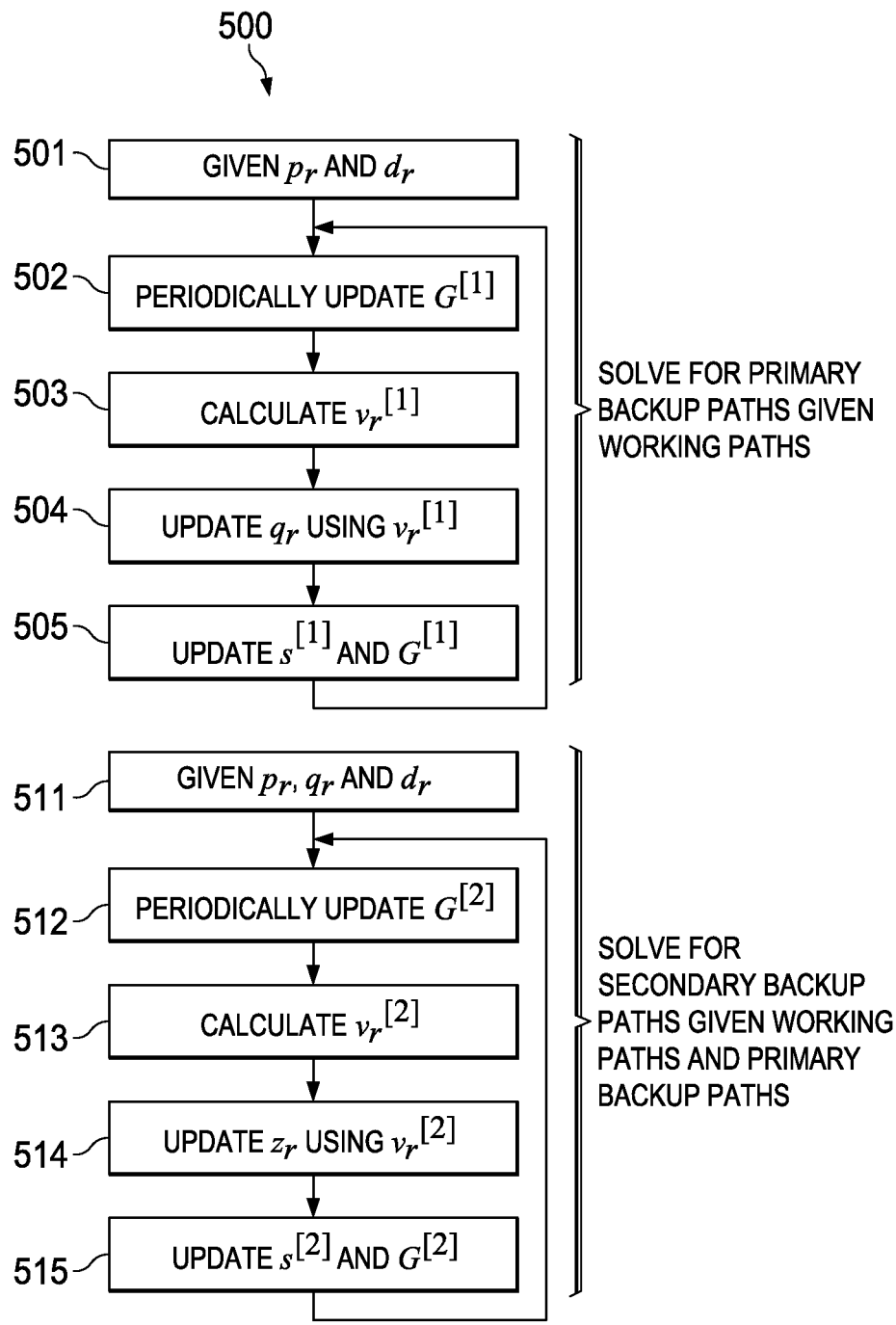
FIG. 5 illustrates an embodiment of a SSR method for spare capacity allocation for dual link failures.

FIG. 5 illustrates an embodiment of a heuristic SSR method 500 for solving the SCA model for dual link failures. The steps 501 to 505 are similar to steps 201 to 205 above and are implemented similarly in an iterative manner to obtain the primary backup paths or routes with minimum total spare capacity shared among the backup routes. However, the spare provision matrix for primary backup paths $G^{[1]} = Q^T M U^{[1]}$ is updated in steps 501 to 505 (instead of $G = Q^T M U$ for the case single link failures). The steps 501 to 505 are repeated until a termination condition is met, e.g., until convergence or a predetermined maximum number of updates is reached. After solving for $G^{[1]}$ for the primary backup paths, steps 511 to 515 are implemented in a similar iterative manner until the termination condition is met. The steps 511 to 515 are similar to the steps 501 to 505. However, the spare provision matrix for secondary backup paths $G^{[2]} = Z^T M U^{[2]}$ is updated in steps 511 to 515 using the primary backup paths obtained from the iterative implementation of steps 501 to 505. The steps 511 to 515 are implemented iteratively to obtain the secondary backup paths or routes with minimum total spare capacity shared among the primary and secondary backup routes.

Similar to the method 200, each step in the method 500 may be implemented iteratively for each flow. Further, the SSR method 500 can be repeated for different random order sets of the flows and the best solution is then selected from all the solutions obtained to provide a near optimal solution for the SCA model for dual link failures, e.g., to avoid local minima results.

In the SSR algorithm for solving dual link failures, the shortest path algorithm for each flow may have a running time of O(N log N), using limited backup path update iterations for each flow, as described above. The algorithm may also have a space complexity of $O(L^2)$ for advertised information, where no per-flow based state information are kept. The algorithm provides near optimal solution for the SCA model for dual link failures with relatively short computation time, e.g., in comparison to using other techniques including AMPL commercial software with ILP solvers, such as CPLEX or Gurobi, which typically use a branch and cut algorithm. The SSR algorithm becomes even more practical and advantageous, e.g., in terms of solution time, in the case of larger networks.

Figure 6:
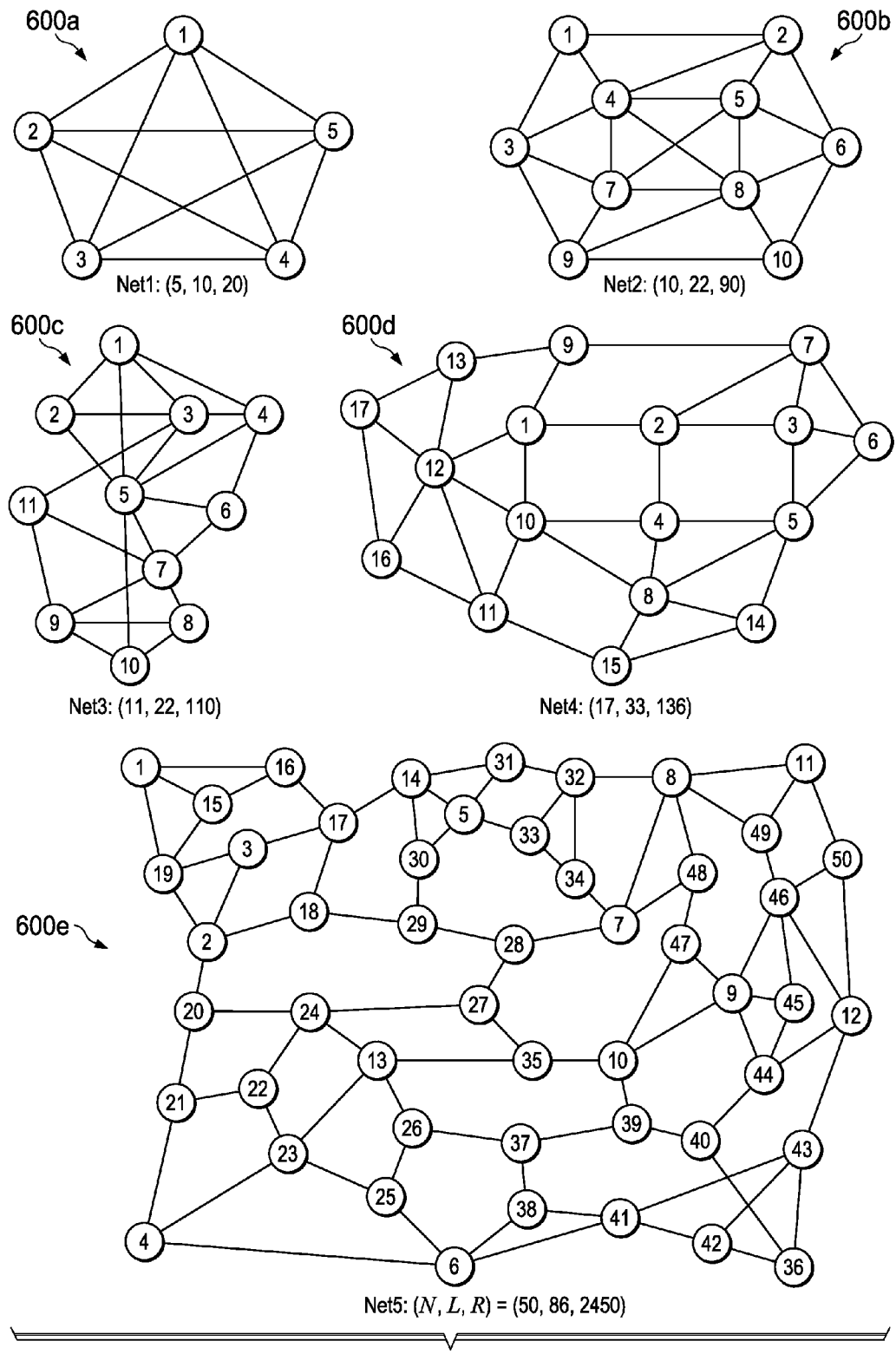
FIG. 6 is a schematic diagram of a plurality of simulated network topologies.

FIG. 6 illustrates a plurality of network topologies 600a to 600e which have been considered in numerical experiments (simulations). The numerical experiments were performed for the network topologies 600a to 600e to examine the SCA model for dual link failures. Each of the network topologies 600a to 600e comprises a plurality of nodes interconnected by a plurality of links, where multiple flows were considered. Each of the network topologies 600a to 600e comprises a different combination of numbers of nodes, links, and flows that are indicated by the triplet (N, L, R). Specifically, the network topology 600a (Net1) comprises 5 nodes, 10 links, and 20 flows (indicated by (5, 10, 20)). The network topology 600b (Net2) comprises 10 nodes, 22 links, and 90 flows. The network topology 600c (Net3) comprises 11 nodes, 22 links, and 110 flows. The network topology 600d (Net4) comprises 17 nodes, 33 links and 272 flows. The network topology 600e (Net5) comprises 50 nodes, 86 links, and 2450 flows.

Figure 7:
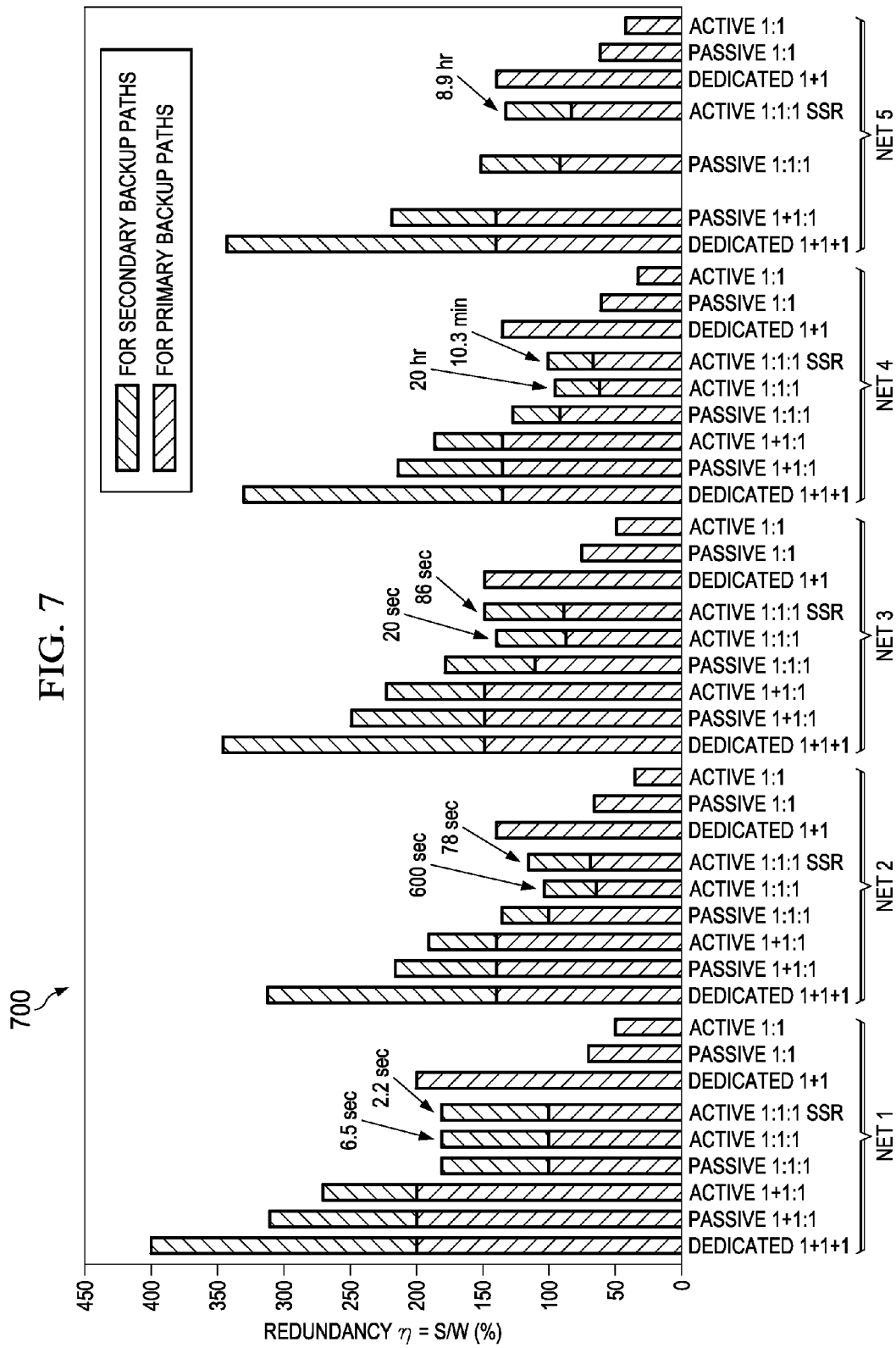
FIG. 7 is a chart of a plurality of numerical results for the simulated network topologies of FIG. 6.

The network node count in the network topologies 600a to 600e ranges from 5 to 50 with an average node degree from 3.4 to 4.4. Each network topology has full-meshed flows with one unit bandwidth demand per flow. The working paths were pre-determined using the shortest path algorithm. Some of the results of the numerical experiments are shown in FIG. 7. The results are obtained using different backup path protection schemes that are based on how the backup paths reserve spare capacity. More details about the numerical experiments and results and the different backup path protection schemes are described by V. Y. Liu, et al., in "Spare Capacity Allocation Using Shared Backup Path Protection for Dual Link Failures," in IEEE 8$^{th}$ International Workshop on the Design of Reliable Communication Networks (DRCN), 2011, and in "Spare Capacity Allocation Using Shared Backup Path Protection for Dual Link Failures," in Computer Communications special issue on reliable communication services, Elsevier, 2012, both of which are incorporated herein by reference.

The backup path protection schemes include passive and active schemes solved using AMPL software with ILP solvers, such as CPLEX or Gurobi, and a mathematical formulation model described in U.S. Patent Application No. 2012/0250500, Oct. 4, 2012 by V. Y. Liu, entitled "Apparatus and Method for Spare Capacity Allocation on Dual Link Failures," which is incorporated herein by reference. Six passive and active schemes (labeled 1:1:1, 1:1:1, and 1+1+1) for dual link failures are shown, including an active 1:1:1 SSR scheme that is based on the method 500. The results also include three additional schemes for single link failures (no secondary backup paths), labeled active 1:1, passive 1:1, and dedicated 1+1.

Comparing the active 1:1:1 SSR scheme to the remaining schemes for dual link failures show an improvement in terms of computation time with about equal network redundancy η of the active 1:1:1 scheme using AMPL software with ILP solvers. The redundancy is a measure of the shared capacity, where reducing redundancy corresponds to reducing shared capacity among the backup paths. The results in FIG. 7 show that the improvement in computation time using the active 1:1:1 SSR scheme increases as the size of the network increases. For instance, in the case of a smaller network such as net 1, a reduction of about 4 seconds was achieved in comparison to the active 1:1:1 scheme using AMPL software. In the case of a larger network such as net 5, the active 1:1:1 SSR scheme has about 8.9 hours computation time, while the active 1:1:1 scheme using AMPL software is not used because it becomes infeasible in terms of higher computation time requirement, which also translates into higher computation cost. Actual or real networks (deployed networks) are typically large networks, e.g., on the order of net 5 or larger. Thus, the SSR algorithm, e.g., based on the method 500, is expected to be advantageous and more scalable to solve the SCA model for dual link failures for real networks.

Figure 8:
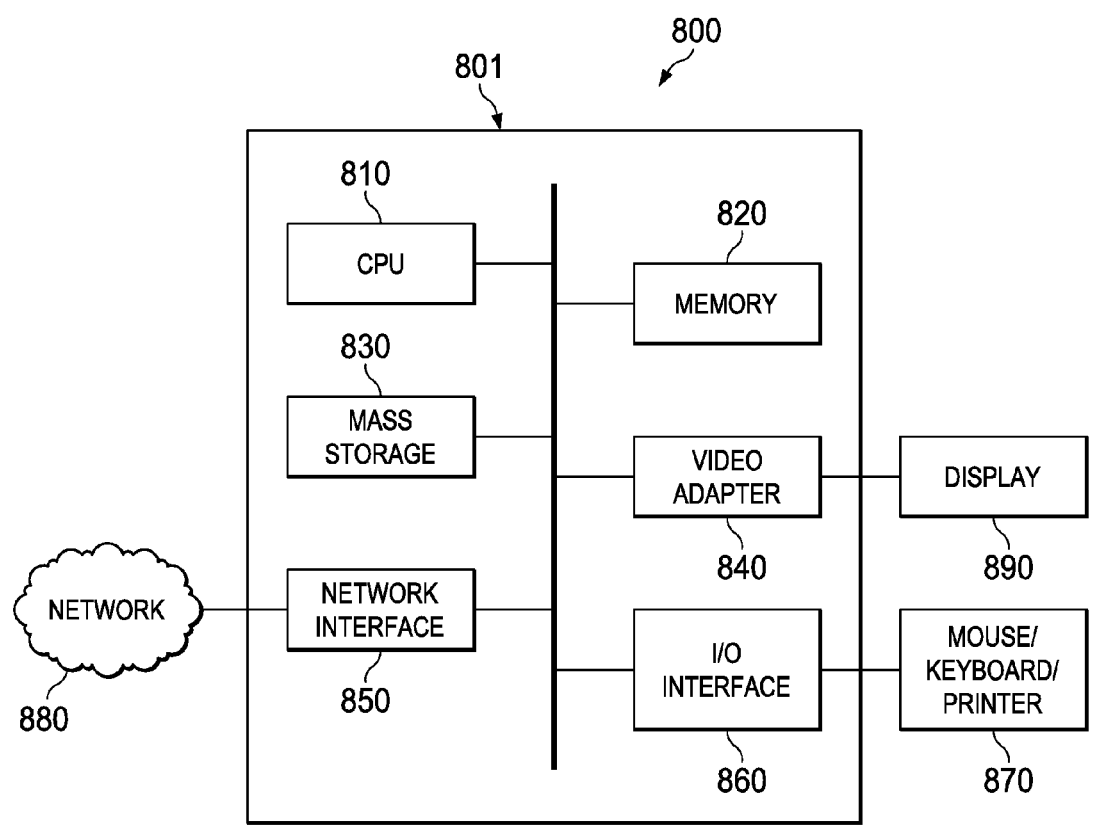
FIG. 8 is a block diagram of a processing system that can be used to implement various embodiments.

FIG. 8 is a block diagram of a processing system 800 that can be used to implement various embodiments. For example, the processing system 800 may be part of or coupled to a network component, such as a router, a server, or any other suitable network component or apparatus. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, a memory 820, a mass storage device 830, a video adapter 840, and an I/O interface 860 connected to a bus. The bus may be one or more of any type of several bus architectures including a memory bus or memory controller, a peripheral bus, a video bus, or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The video adapter 840 and the I/O interface 860 provide interfaces to couple external input and output devices to the processing unit. As illustrated, examples of input and output devices include a display 890 coupled to the video adapter 840 and any combination of mouse/keyboard/printer 870 coupled to the I/O interface 860. Other devices may be coupled to the processing unit 801, and additional or fewer interface cards may be utilized. For example, a serial interface card (not shown) may be used to provide a serial interface for a printer.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method implemented by an apparatus for allocating shared spare resource capacity for a plurality of flows on a plurality of working paths in a network, the method comprising:
   iteratively updating shortest cost link information for a plurality of primary backup paths corresponding to the working paths using initial spare capacity provisioning information for the primary backup paths;
   iteratively updating spare capacity provisioning information for the primary backup paths according to the updated shortest cost link information for the primary backup paths to provide final spare capacity provisioning information for the primary backup paths, wherein the iteratively updating steps for the primary backup paths comprise:
      determining, for a plurality of primary backup paths corresponding to the working paths, flow failure information and tabu link information using link information for the working paths and link failure information for the working paths;
      determining initial spare capacity provisioning information for the primary backup paths using the flow failure information;
      determining link cost of the initial spare capacity provisioning information;
      determining new link information for the primary backup paths to minimize shortest path using the link cost and excluding the tabu link information;
      upon determining that that the new link information provide shorter path than current link information, replacing the current link information with the new link information for the primary backup paths;
      updating the spare capacity provisioning information for the primary backup paths using the new link information; and
      repeating the steps to provide final spare capacity information for the primary backup paths; and
   iteratively updating shortest cost link information for a plurality of secondary backup paths corresponding to the working paths using initial spare capacity provisioning information for the secondary backup paths and the final spare capacity provisioning information for the primary backup paths as obtained by iteratively updating the spare capacity provisioning information for the primary backup paths; and
   iteratively updating spare capacity provisioning information for the secondary backup paths according to the updated shortest cost link information for the secondary backup paths to provide final spare capacity provisioning information for the secondary backup paths and the primary backup paths, wherein the iteratively updating steps for the secondary backup paths comprise implementing for the secondary backup paths similar determining, replacing, updating and repeating steps as the iteratively updating steps for the primary backup paths, while keeping the final spare capacity information for the primary backup paths fixed in value, thereby to provide final spare capacity information for a plurality of secondary backup paths for the working paths with minimum total capacity shared among the primary backup paths and the secondary backup paths, and wherein, when a working path fails, traffic is routed to a corresponding primary backup path, and when both the working path and the corresponding primary backup path fail, traffic is routed to a corresponding secondary backup.

2. The method of claim 1 further comprising:
   determining the final spare capacity provisioning information for the primary backup paths and the secondary backup paths for each of the flows separately; and
   aggregating the final spare capacity provisioning information for the primary backup paths and the secondary backup paths for all the flows.

3. The method of claim 1, wherein the primary backup paths do not share links with the corresponding working paths, and wherein the secondary backup paths do not share links with the primary backup paths and the working paths.

4. The method of claim 1 further comprising determining the initial spare capacity provisioning information for the primary backup paths and the secondary backup paths using link information for the primary backup paths and the secondary backup paths, link bandwidth information, link information for the working paths, and link failure information for the working paths.

5. The method of claim 4 further comprising:
   determining the initial spare capacity provisioning information for each of the flows for each considered link and each considered failure scenario using flow failure information; and
   aggregating the final spare capacity provisioning information for all the flows.

6. The method of claim 5, wherein the flow failure information is determined using the link information for the primary backup paths and the secondary backup paths and the link information for the working paths.

7. The method of claim 5 wherein the flow failure information is determined using the link information for the working paths.

8. The method of claim 1, wherein the steps are implemented in an iterative manner until there are no further updates for the spare capacity provisioning information for the primary backup paths for all flows.

9. The method of claim 1, wherein the steps are implemented in an iterative manner until a predetermined number of updates for the spare capacity provisioning information for the primary backup paths is reached.

10. The method of claim 1, further comprising: repeating the steps for a plurality of different randomly ordered flows;

and selecting a best solution for the spare capacity provisioning information for the primary backup paths from a plurality of solutions corresponding to the different randomly ordered flows.

11. An apparatus for allocating shared spare resource capacity for a plurality of flows on a plurality of working paths in a network, comprising:
a processor; and
a non-transitory computer readable storage medium storing programming for execution by the processor, the programming including instructions to:
iteratively update shortest cost link information for a plurality of primary backup paths corresponding to the working paths using initial spare capacity provisioning information for the primary backup paths;
iteratively update spare capacity provisioning information for the primary backup paths according to the updated shortest cost link information for the primary backup paths to provide final spare capacity provisioning information for the primary backup paths, wherein the iteratively updating steps for the primary backup paths comprise:
determining, for a plurality of primary backup paths corresponding to the working paths, flow failure information and tabu link information using link information for the working paths and link failure information for the working paths;
determining initial spare capacity provisioning information for the primary backup paths using the flow failure information;
determining link cost of the initial spare capacity provisioning information;
determining new link information for the primary backup paths to minimize shortest path using the link cost and excluding the tabu link information;
upon determining that that the new link information provide shorter path than current link information, replacing the current link information with the new link information for the primary backup paths;
updating the spare capacity provisioning information for the primary backup paths using the new link information; and
repeating the steps to provide final spare capacity information for the primary backup paths; and
iteratively update shortest cost link information for a plurality of secondary backup paths corresponding to the working paths using initial spare capacity provisioning information for the secondary backup paths and the final spare capacity provisioning information for the primary backup paths as obtained by iteratively updating the spare capacity provisioning information for the primary backup paths; and
iteratively update spare capacity provisioning information for the secondary backup paths according to the updated shortest cost link information for the secondary backup paths to provide final spare capacity provisioning information for the secondary backup paths and the primary backup paths, wherein the iteratively updating steps for the secondary backup paths comprise implementing for the secondary backup paths similar determining, replacing, updating and repeating steps as the iteratively updating steps for the primary backup paths, while keeping the final spare capacity information for the primary backup paths fixed in value, thereby to provide final spare capacity information for a plurality of secondary backup paths for the working paths with minimum total capacity shared among the primary backup paths and the secondary backup paths, and wherein, when a working path fails, traffic is routed to a corresponding primary backup path, and when both the working path and the corresponding primary backup path fail, traffic is routed to a corresponding secondary backup.

12. The apparatus of claim 11, wherein at least some of the primary backup paths and secondary backup paths are joint paths that share one or more links.

13. The apparatus of claim 11, wherein determining in an iterative manner the final spare capacity provisioning information for the primary backup paths and subsequently the secondary backup paths is scalable with a size of the network, and wherein increasing the size of the network increases a computation time for determining the final spare capacity provisioning information.

14. The apparatus of claim 11, wherein determining in an iterative manner the final spare capacity provisioning information for the primary backup paths and subsequently the secondary backup paths has faster computation time than A Mathematical Programming Language (AMPL) software with integer linear programming (ILP) solver for minimizing shared spare resource capacity allocation for the primary backup paths and the secondary backup paths.

15. The apparatus of claim 14, wherein the faster computation time in comparison to the AMPL software with ILP solver improves as a size of the network increases.

* * * * *